(No Model.)
L. R. SASSINOT.
Filter.
No. 232,072.          Patented Sept. 7, 1880.
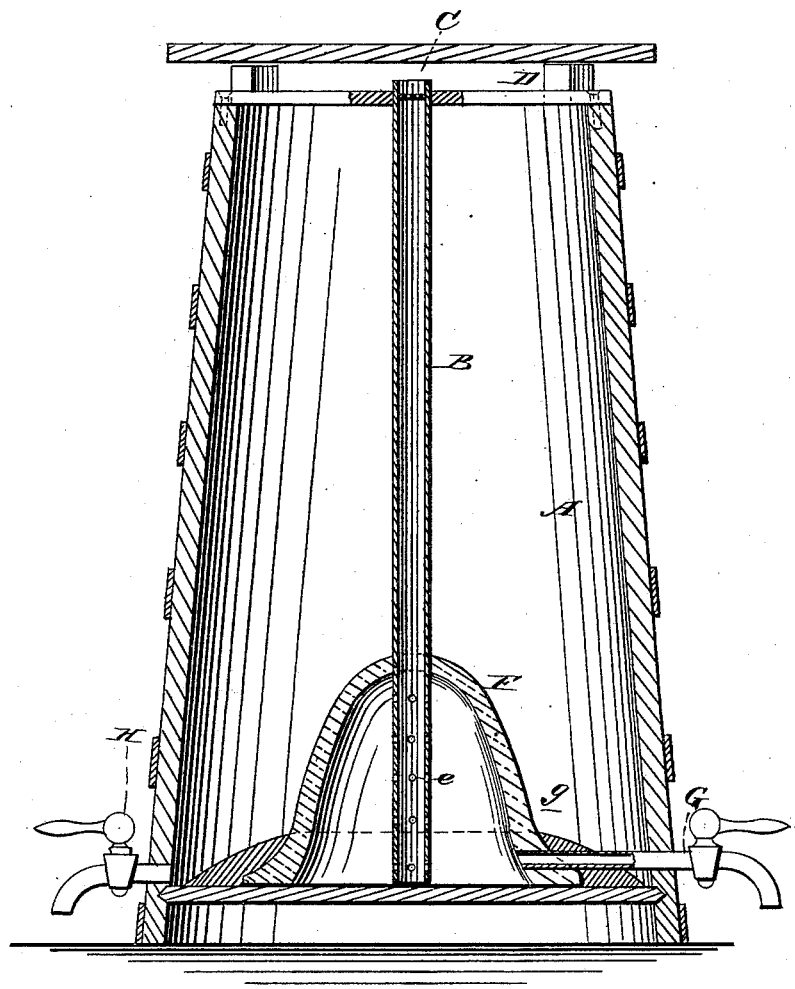
WITNESSES:
INVENTOR:
L. R. Sassinot
BY Munn & Co
ATTORNEYS.

UNITED STATES PATENT OFFICE.

LOUIS R. SASSINOT, OF NEW ORLEANS, LOUISIANA.

FILTER.

SPECIFICATION forming part of Letters Patent No. 232,072, dated September 7, 1880.

Application filed May 10, 1880. (No model.)

*To all whom it may concern:*

Be it known that I, LOUIS R. SASSINOT, of New Orleans, in the parish of Orleans and State of Louisiana, have invented a new and useful Improvement in Filters, of which the following is a specification.

My invention relates to a means for filtering the water collected in cisterns of ordinary construction in order to render it fit for drinking, cooking, and other purposes.

The invention consists in a novel construction and improved form of the filter, and the combination therewith of a faucet for drawing off the filtered water and a faucet for drawing off the unfiltered water, as hereinafter particularly described.

The accompanying drawing represents a vertical sectional view of a cistern provided with my improved filter.

A represents the cistern, which may be of any suitable construction and description. In the center of the cistern is a vertical pipe, B, near the upper end of which is a screen, C, of wire-gauze, the object of which is to prevent the entrance of insects or of foreign substances of any kind into the pipe B. The lower end of the pipe B is secured to the bottom of the cistern, and the upper end held in place by a cross-bar, D. The lower portion of the pipe B is provided with perforations $e$. In the bottom of the cistern is a filter, F, which may be made of any suitable material. It is of capsule or approximate conical form, and provided with a flanged base or bottom, by which it is secured to the bottom of the cistern by means of cement of any suitable description.

G is a faucet, provided with a long shank, $g$, which passes through the wall of the cistern and through the filter and communicates with the space inside of said filter.

H is a faucet, the shank of which passes through the wall of the cistern and communicates with the space outside of the filter.

The water in the cistern A is filtered by passing through the filter F in the usual manner. By means of the faucet G the filtered water is drawn off, and by means of the faucet H the unfiltered water and the sediment and impurities are drawn off.

Having thus described my invention, I claim as new and desire to secure by Letters Patent—

The combination, with a water-cistern having cocks G H at the lower end for the discharge of the filtered and unfiltered water, and the central vertical air-pipe, B, the latter provided with perforations near its lower end, of a median conical filter surrounding pipe B above its perforations, and having a flange by which it is cemented to the bottom of cistern, as described.

LOUIS ROMAIN SASSINOT.

Witnesses:
P. B. FOURNIER,
T. AUFINKOLK.